(12) United States Patent
Ha et al.

(10) Patent No.: US 8,992,739 B2
(45) Date of Patent: Mar. 31, 2015

(54) METHOD FOR MANUFACTURING SILICON-BASED NANOCOMPOSITE ANODE ACTIVE MATERIAL FOR LITHIUM SECONDARY BATTERY AND LITHIUM SECONDARY BATTERY USING SAME

(71) Applicant: Korea Electrotechnology Research Institute, Changwon-si, Gyeongsangnam-do (KR)

(72) Inventors: Yoon-cheol Ha, Gimhae-si (KR); Chil-hoon Doh, Changwon-si (KR); Chu-hyun Cho, Changwon-si (KR)

(73) Assignee: Korea Electrotechnology Research Institute (KR)

( * ) Notice: Subject to any disclaimer, the term of this patent is extended or adjusted under 35 U.S.C. 154(b) by 118 days.

(21) Appl. No.: 13/910,321

(22) Filed: Jun. 5, 2013

(65) Prior Publication Data

US 2013/0264190 A1    Oct. 10, 2013

Related U.S. Application Data (63) Continuation of application No. PCT/KR2012/000351, filed on Jan. 16, 2012.

(30) Foreign Application Priority Data

Jun. 2, 2011    (KR) .................. 10-2011-0053319

(51) Int. Cl.
| | | |
|---|---|---|
| *H05F 3/00* | (2006.01) | |
| *B01J 19/08* | (2006.01) | |
| *H01M 4/134* | (2010.01) | |
| *H01M 4/38* | (2006.01) | |
| *H01M 4/36* | (2006.01) | |
| *H01M 10/052* | (2010.01) | |

(52) U.S. Cl.
CPC .............. *B01J 19/088* (2013.01); *H01M 4/134* (2013.01); *H01M 4/386* (2013.01); *H01M 4/364* (2013.01); *H01M 10/052* (2013.01); *Y02E 60/122* (2013.01); *Y10S 977/932* (2013.01); *Y10S 977/948* (2013.01); *Y10S 977/773* (2013.01)
USPC ...... 204/164; 422/186; 422/186.03; 977/932; 977/948; 977/773; 429/218.1

(58) Field of Classification Search
CPC ..... H01M 4/364; H01M 4/134; H01M 4/386; H01M 10/052; Y02E 60/122
USPC ........... 204/164; 422/186, 186.03; 429/218.1; 977/932, 948, 773; 219/121.47, 121.36
See application file for complete search history.

(56) References Cited

U.S. PATENT DOCUMENTS

| | | | |
|---|---|---|---|
| 6,743,406 B2 * | 6/2004 | Nayfeh et al. ................ | 423/348 |
| 2009/0014423 A1 * | 1/2009 | Li et al. .................... | 219/121.47 |
| 2013/0189446 A1 * | 7/2013 | Casey et al. .................... | 427/569 |

* cited by examiner

*Primary Examiner* — Xiuyu Tai
(74) *Attorney, Agent, or Firm* — Park & Associates IP Law, P.C.

(57) ABSTRACT

A method for manufacturing a silicon-based nanocomposite anode active material for the lithium secondary battery and the lithium secondary battery using same, comprising the following steps: a first step of mounting a silicon-based wire between two electrodes, which are placed in a methanol-based solvent atmosphere, and manufacturing a dispersion solution in which silicon-based nanoparticles are dispersed by means of high-voltage pulse discharging; and a second step of manufacturing a silicon-based nanocomposite body by compositing the silicon-based nanoparticles in the solution and a different type of material. By using the silicon-based nanocomposite anode in the lithium secondary battery according to the method, the advantages provided are of improving electronic conductivity and lithium-ion conductivity by means of the different type of material having a high-capacity characteristic, which encases the silicon-based nanoparticles, and of providing the lithium-ion secondary battery having enhanced battery capacity and charge/discharge cycle properties.

11 Claims, 6 Drawing Sheets

METHOD FOR MANUFACTURING SILICON-BASED NANOCOMPOSITE ANODE ACTIVE MATERIAL FOR LITHIUM SECONDARY BATTERY AND LITHIUM SECONDARY BATTERY USING SAME

REFERENCE TO RELATED APPLICATIONS

This is a continuation of pending International Patent Application PCT/KR2012/000351 filed on Jan. 16, 2012, which designates the United States and claims priority of Korean Patent Application No. 10-2011-0053319 filed on Jun. 2, 2011, the entire contents of which are incorporated herein by reference.

FIELD OF THE INVENTION

The present invention relates to a method of preparing a silicon-based nanocomposite anode active material for a lithium secondary battery and a lithium secondary battery using the same. More particularly, the present invention relates to a method of preparing a silicon-based nanocomposite anode active material for a lithium secondary battery, wherein a silicon-based wire is mounted between two electrodes under a methanol-based solvent atmosphere, high-voltage pulses are applied to both ends of the silicon-based wire to gasify the silicon-based wire and disperse silicon-based nanoparticles in the solvent by instantaneous resistance heating to prepare a silicon-based nanoparticle-dispersed solution, and then this solution is combined with a different kind of material to prepare a silicon-based nanocomposite anode material, thereby providing a lithium secondary battery having improved characteristics, and to a lithium secondary battery using the same.

BACKGROUND OF THE INVENTION

Recently, demand for lithium secondary batteries as power sources of personal digital assistants such as mobile phones, smart phones, tablet PCs and the like or electric automobiles such as hybrid electric cars, plug-in electric cars and the like has greatly increased. Particularly, high-power and high-energy-density active materials, which can replace cathode and anode materials of commonly-used lithium secondary batteries, have actively been developed.

Most of commonly-used lithium secondary batteries are problematic in that high-speed charge and discharge thereof is difficult because the theoretical capacity of graphite used as an anode is about 372 mAh/g and the interlayer diffusion speed of lithium is low. As active materials for overcoming this problem, silicon-based composite anode materials having a theoretical capacity of about 4200 mAh/g have attracted considerable attention for more than the last twenty years. Particularly, commercially-available silicon-graphite composite anode materials have been competitively developed in the related industry. However, these silicon-graphite composite anode materials reach a limit to the competition with graphite in terms of process cost in spite of their high energy density and improved charge-discharge cycle characteristics.

Meanwhile, like most metal materials electrochemically alloyed with lithium, silicon is also required to have its particles converted into nanosized particles and its performance to be improved by combination with lithium active/inactive materials in order to solve problems of mechanical damage of an electrode caused by volume expansion and contraction due to charge and discharge and the rapid reduction of the life-cycle of an electrode caused by mechanical damage thereof.

Most research into manufacturing a nanosized silicon-based anode is based on a mechanical pulverization method, a mechanical compounding method, a vapor synthesis method, a solution-based chemical synthesis method or the like. This nanosized silicon-based anode exhibits excellent characteristics as an anode of a secondary battery, but cannot be easily put to practical use as a commercially-available anode due to problems of complicated synthesis processes, high material cost, impurity influx, cost for waste disposal, formation of oxides accompanying synthesis procedure, and the like.

Electric explosion technologies have been developed over a long period of time as technologies for synthesizing nanopowder in large quantities. Recently, a technology for electrically exploding a semiconductor material in a liquid (Korean Patent Application No. 10-2008-0126028) was developed, thus proposing a possibility of silicon being electrically exploded in a liquid. However, since silicon is oxidized into $SiO_2$ in an aqueous solution, there is a problem in that it is not suitably used as an anode active material for a lithium secondary battery. Further, since silicon is converted into a large amount of silicon carbide and is formed on the surface thereof with a carbon layer in an organic solvent such as ethanol, hexane or the like, there is a problem in that the performance of a silicon nanocomposite is greatly deteriorated.

SUMMARY OF THE INVENTION

Accordingly, the present invention has been devised to solve the above problems, and an object of the present invention is to provide a method of preparing a silicon-based nanocomposite anode active material for a lithium secondary battery, wherein a silicon-based wire is mounted between two electrodes under a methanol-based solvent atmosphere in which a small amount of carbon remains even during high-temperature pyrolysis of an electric explosion process, high-voltage pulses are applied to both ends of the silicon-based wire to gasify the silicon-based wire and disperse silicon-based nanoparticles in the solvent by instantaneous resistance heating to prepare a silicon-based nanoparticle-dispersed solution, and then this solution is combined with a different kind of material to prepare a silicon-based nanocomposite anode material, thereby providing a lithium secondary battery having improved characteristics, and to provide a lithium secondary battery using the same.

In order to accomplish the above object, the present invention provides a method of preparing a silicon-based nanocomposite anode active material for a lithium secondary battery, including the steps of: 1) mounting a silicon-based wire between two electrodes provided in a methanol-based solvent atmosphere and then conducting high-voltage discharge to prepare a dispersion solution in which silicon nanoparticles are dispersed; and 2) combining the silicon nanoparticles with a different kind of material to prepare silicon-based nanocomposites, and provides a lithium secondary battery using the same.

Here, the silicon-based wire may be made in the form of a wire, bar or ribbon by molding any one selected from among a silicon wafer, a silicon powder, a silicon alloy, and a mixed powder of silicon and a metal.

Further, in step 1), the methanol-based solvent may be pure methanol, a mixed solvent containing 50% or more of methanol or a solution in which a dispersant, a surfactant or a different kind of precursor is dissolved in the pure methanol or the mixed solvent.

In addition, the method may further include the step of controlling the sizes of the silicon-based nanoparticles using any one method of natural sedimentation, centrifugal separation and filtering, after step 1).

Further, in step 2), the different kind of material may be an active material having reactivity with lithium and may include at least one selected from among C, Ge, Sn, Zn, Sb, Ag, Al, In, Pb, Te, S, P, Se, Mg, Ca, Ru, Rh, Pd, SiO, $TiO_2$, CoO, NiO, $Fe_2O_3$, $Mn_2O_3$, ZnO, and precursors thereof that can be synthesized by post-treatment.

Further, in step 2), the different kind of material may be an inactive material having no reactivity with lithium and may include at least one selected from among Ti, V, Cr, Mn, Fe, Ni, Co, Cu, SiC, $SiO_2$, $ZrO_2$, $Al_2O_3$, $Li_2O$, $Na_2O$, CaO, MgO, BeO, $WO_3$, $MoO_2$, and precursors thereof that can be synthesized by post-treatment, wherein the inactive material is used in order to improve the conductivity of an electrode and the charge-discharge cycle life thereof.

Further, in step 2), the silicon-based nanocomposites may be prepared by recovering the silicon nanoparticles from the dispersion solution in the form of powder and then combining the powdered silicon nanoparticles with a different kind of material, or may be prepared by dissolving or dispersing the different kind of material in the dispersion solution and then performing any one selected from among drying, pyrolysis, combustion reduction, chemical reduction, mechanical alloying and combinations thereof.

According to the method of preparing a silicon-based anode active material of the present invention, the problem of the volume expansion and contraction of a silicon-based anode active material accompanying the reaction with lithium and the problem of rapidly reduction of lifecycle of the silicon-based anode active material due to the volume expansion and contraction thereof can be easily solved by the conversion of particles into nanoparticles and the combination of the silicon-based anode active material with lithium active/inactive materials. Particularly, according to the method of the present invention, there are advantages in that a nanoparticle forming process is very simple, energy consumption is low, mass production is possible, this method is scarcely harmful to the environment and the human body because the silicon-based anode active material is prepared in the form of nanoparticles dispersed in a methanol-based solvent, and by-products and wastes are scarcely produced.

DETAILED DESCRIPTION OF THE INVENTION

The present invention intends to provides a method of preparing a silicon-based nanocomposite anode active material for a lithium secondary battery, including the steps of: forming silicon, a silicon wafer, a silicon powder, a silicon alloy or a mixed powder of silicon and other metals into a wire; applying a high-voltage pulse to a chamber filled with pure methanol, a mixed solvent containing 50% or more of methanol or a methanol-based solvent in which a dispersant, a surfactant or a carbon precursor is dissolved, to gasify the wire by instantaneous resistance heating to prepare a dispersion solution in which silicon-based nanoparticles are dispersed; and combining this dispersion solution with a different kind of material.

According to the above method, a process of preparing nanoparticles is very simple, and nanoparticles can be easily produced in large amounts. Further, since nanoparticles are dispersed in a liquid, large particles can be easily removed by natural sedimentation or centrifugal separation, and thus various types of silicon-based nanocomposites can be prepared.

In the method of preparing a silicon-based nanocomposite, the silicon-based nanocomposites may be prepared by recovering silicon nanoparticles from a silicon nanoparticle-dispersed solution in the form of powder and then combining the powdered silicon nanoparticles with a different kind of material, or may be prepared by dissolving or dispersing a different kind of material in methanol and then performing any one selected from among drying, pyrolysis, combustion reduction, chemical reduction, mechanical alloying, and combinations thereof.

In the high-voltage pulse generator for preparing the silicon-based anode active material of the present invention, a silicon wire is connected between two electrodes placed in a solvent charged in a chamber, and electrical energy charged in a capacitor by a high-voltage charger is instantaneously discharged to the silicon wire at the time of turning a switch ON to gasify and condense the silicon wire by resistance heating, thereby preparing silicon particles. When the provision of the silicon wire and the charging and discharging of electric energy are repeatedly performed, silicon particles can be prepared in an amount of several tens of grams to several hundreds of grams per hour. In this case, since silicon particles are dispersed in a methanol-based solvent, not an aqueous solution, the excessive oxidization of silicon particles into $SiO_2$ can be prevented, silicon particles are not discharged in the air to minimize the harmfulness of silicon nanoparticles to the environment and the human body, and the sizes of silicon particles in a solution can be easily controlled by natural sedimentation, centrifugal separation, filtering or the like. Further, since chemical agents are scarcely introduced except the solution and the silicon wire, the formation of by-products or wastes can be minimized to realize a clean process.

Figure 1:
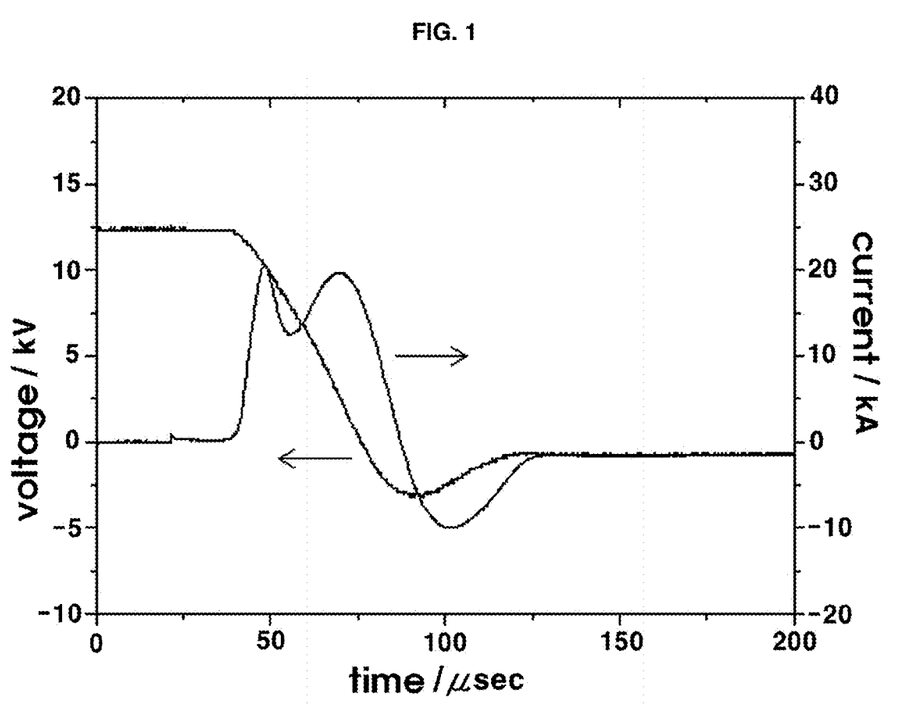
FIG. 1 is a graph showing the changes in voltage and current generated by high-voltage pulse discharging of a high-voltage pulse generator used in the method of the present invention.

FIG. 1 is a graph showing the changes in voltage and current generated by high-voltage pulse discharging of a high-voltage pulse generator. From FIG. 1, it can be ascertained that, when a switch turns ON at an initial voltage of 12.3 kV, a voltage decreases, and simultaneously a pulse current of about 20 kA flows. The moment that gasification takes places, the voltage is instantaneously increased, and current is instantaneously decreased, and subsequently, plasma is formed by the electrolytic dissociation of gas, thus causing current to be increased again. The energy consumption necessary for the formation and extinction of plasma occurring within several tens of microseconds is sufficient if it is 2~5 times the gasification energy of silicon, regardless of high initial voltage and instantaneous high current, thus reducing the energy consumption for producing nanoparticles.

Figure 2:
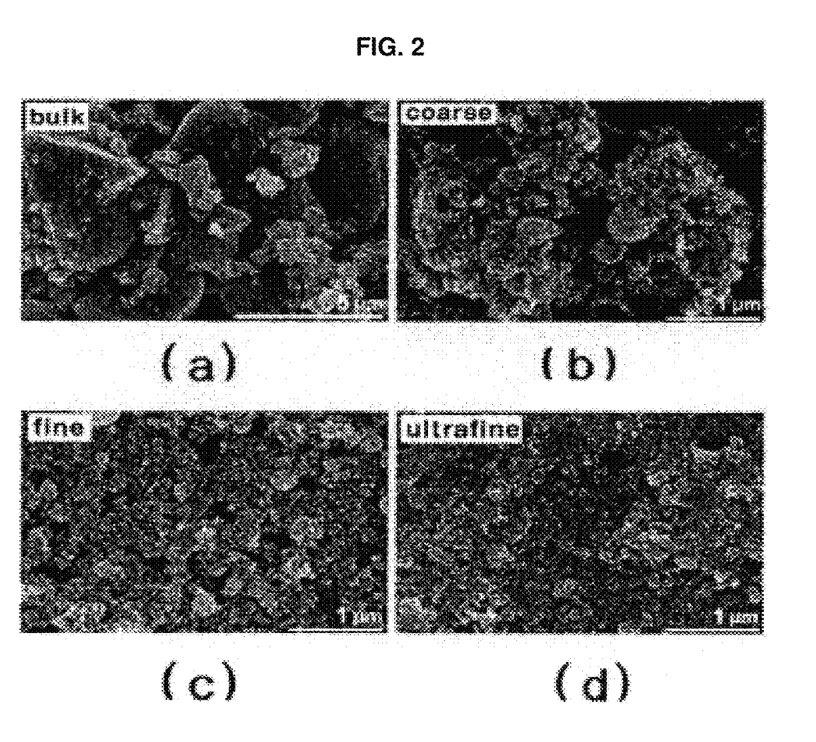
FIG. 2 shows scanning electron micrographs of powder obtained by centrifugally separating a silicon-based nanoparticle dispersed solution and then classifying the silicon-based nanoparticles according to particle size.

FIG. 2 shows a scanning electron micrograph ((a) of FIG. 2) of commonly-used silicon powder and scanning electron micrographs ((b)~(d) of FIG. 2) of powders obtained by sequentially centrifugally separating silicon nanoparticles formed in methanol and then classifying the silicon nanoparticles according to particle size. As shown in (a) of FIG. 2, it can be seen that commonly-used silicon powder (bulk) has a particle size of 5~10 μm. The powders shown in (b)~(d) of FIG. 2 were obtained by removing large particles from a silicon particle-dispersed methanol by natural sedimentation and then recovering powders therefrom using a bottom-up continuous separator at a rotation speed of 10,000 rpm. Here, (b) of FIG. 2 shows coarse powder recovered from the lower end of a Teflon sheet provided in the centrifugal separator and including relatively large particles (several hundreds of nanometers~1 micrometer), (c) of FIG. 2 shows fine powder recovered from the middle portion of the Teflon sheet and including particles of 200 nm or less, and (d) of FIG. 2 shows ultrafine powder recovered from the upper end of the Teflon sheet and including particles of 100 nm or less. As such, powders can be classified according to particle size. However, in order to simplify a process, the dispersibility of silicon particles is improved using a suitable dispersant, and natural sedimentation time is controlled, and thus large particles having a negative influence on the life cycle characteristics of an anode can be removed.

A silicon-based nanoparticle dispersed solution was prepared in this way. Based on this solution, a method of preparing a silicon-based nanocomposite anode active material will be described in detail with reference to the following Examples.

Example 1

A 4-inch silicon wafer having a thickness of 0.525 mm was cut at 1 mm width intervals, formed into a silicon wire having a length of 70 mm, and then mounted between two stainless steel electrodes placed in methanol. A 52 μF capacitor was charged to a direct voltage of 12.3 kV, and was then instantaneously discharged through the two electrodes to gasify the silicon wire by resistance heating. In the silicon nanoparticles made by the gasification and condensation of the silicon wire in methanol, unlike another organic solvent, the amount of a carbon film formed on the surface thereof by the carbonization of an organic solvent and the amount of silicon carbide (SiC) formed by the chemical reaction of silicon and carbon could be minimized. Further, even when a dispersant was not additionally used, dispersibility was maintained for a long period of time, and thus large particles could be easily removed by natural sedimentation. In order to evaluate the anode characteristics of a lithium secondary battery according to particle size, polyvinylpyrrolidone (hereinafter, PVP), which is a dispersant easily dissolved in methanol, was added to the large particle-removed solution, and silicon-PVP powder, the particle sizes of which are different according to the position of a Teflon sheet as shown in (b)~(d) of FIG. 2, was recovered using a bottom-up continuous centrifugal separator at a rotation speed of 10,000 rpm.

Figure 3:
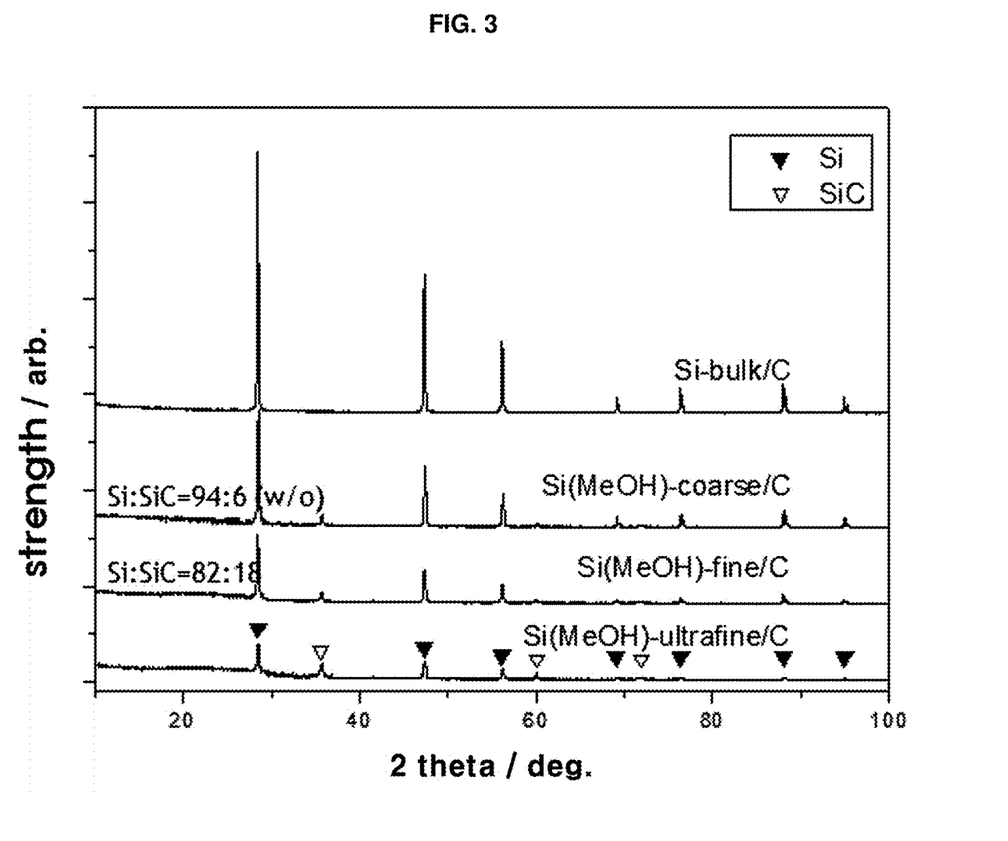
FIG. 3 is a graph showing the X-ray analysis results of a commonly-used silicon powder (bulk)-carbon nanocomposite anode active material and the X-ray analysis results of the silicon (coarse, fine, ultrafine)-carbon nanocomposite anode active material of the present invention according to particle size.

FIG. 3 shows an X-ray diffraction pattern of the silicon-PVP powder recovered in this way according to particle size. From FIG. 3, it can be ascertained that the amount of silicon carbide is very small. Further, it can be ascertained that silicon carbide particles are ultrafine particles because peaks corresponding to silicon carbide appear relatively large on the Teflon sheet.

Figure 4:
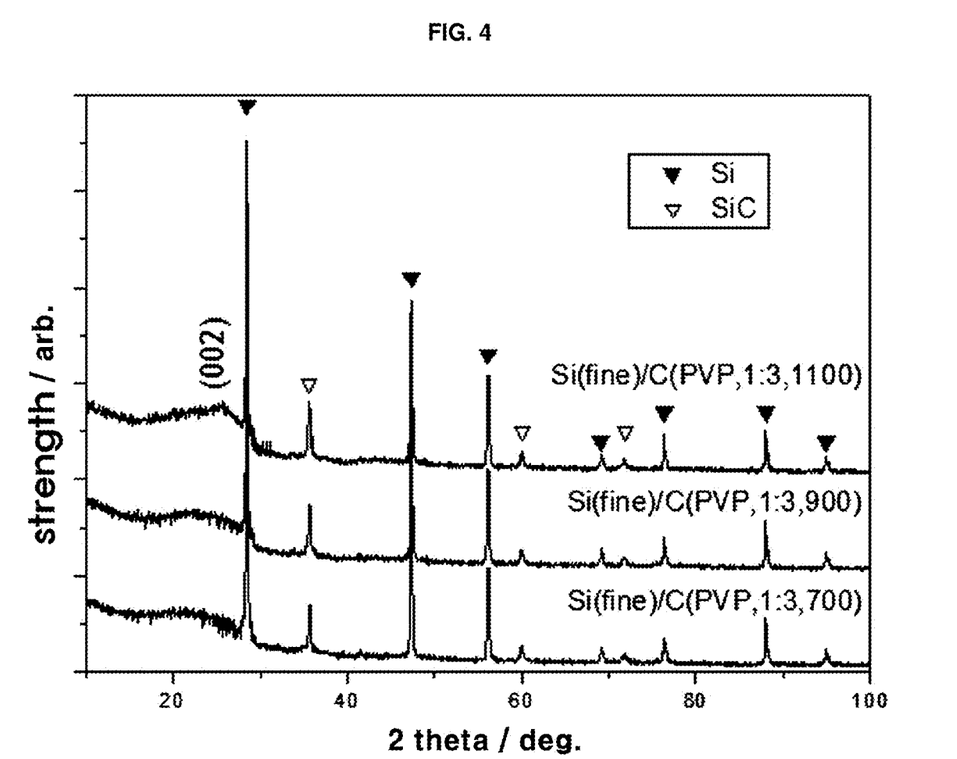
FIG. 4 is a graph showing the X-ray analysis results of the silicon-carbon nanocomposite anode active material of the present invention according to heat treatment temperature (700, 900, and 1100° C.).

FIG. 4 shows an X-ray diffraction pattern of a silicon-carbon nanocomposite anode active material prepared by re-dispersing the silicon-PVP powder recovered from the middle portion of the Teflon sheet in methanol, additionally dissolving PVP in methanol such that the weight ratio of silicon and PVP is 1:3 and then drying the solution, and then heat-treating the silicon-PVP powder under an argon atmosphere of 700° C., 900° C. and 1100° C. The silicon-carbon nanocomposite anode active material includes carbon-coated silicon as a main component, and a part of silicon carbide acts as an inactive different kind of material.

Figure 5:
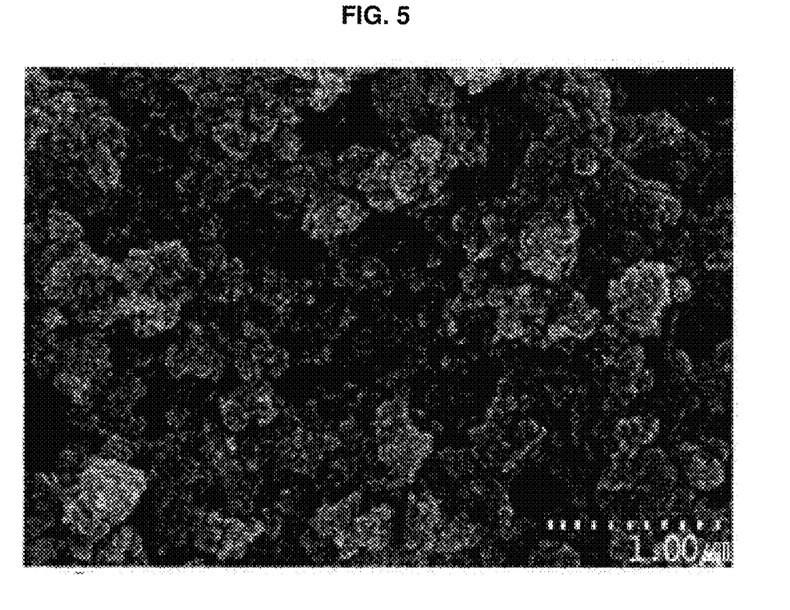
FIG. 5 shows a scanning electron micrograph of the silicon-carbon nanocomposite anode active material of the present invention.

FIG. 5 shows a scanning electron micrograph of the silicon-carbon nanocomposite anode active material. From FIG. 5, it can be seen that the main component of the silicon-carbon nanocomposite anode active material is carbon-coated silicon.

Figure 6:
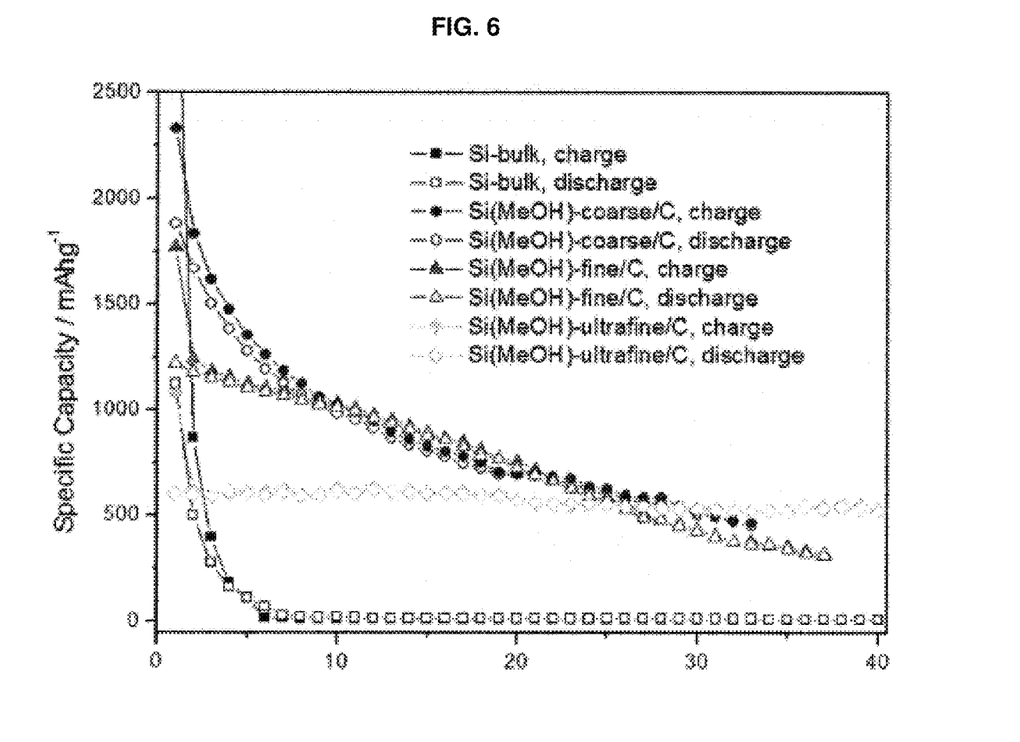
FIG. 6 is a graph showing the charge-discharge cycle characteristics of a commonly-used silicon powder (bulk)-carbon nanocomposite anode active material and the charge-discharge cycle characteristics of the silicon (coarse, fine, ultrafine)-carbon nanocomposite anode active material of the present invention according to particle size.

FIG. 6 shows the charge-discharge cycle characteristics of the silicon-carbon nanocomposite anode active material according to particle size under the heat treatment condition of 700° C. From FIG. 6, it can be ascertained that, as particle size decreases, the charge-discharge cycle characteristics of the silicon-carbon nanocomposite anode active material are greatly improved although the initial capacity thereof decreases.

In the above heat treatment condition, when the crystallinity of carbon is improved by increasing the heat treatment temperature under the condition that amorphous carbon is made by the pyrolysis of PVP, the charge-discharge cycle characteristics thereof can be improved. Particularly, since most particles prepared by electric explosion are fine particles shown in FIG. 6, the charge-discharge cycle characteristics thereof was improved while changing the heat treatment condition of the fine particles.

Figure 7:
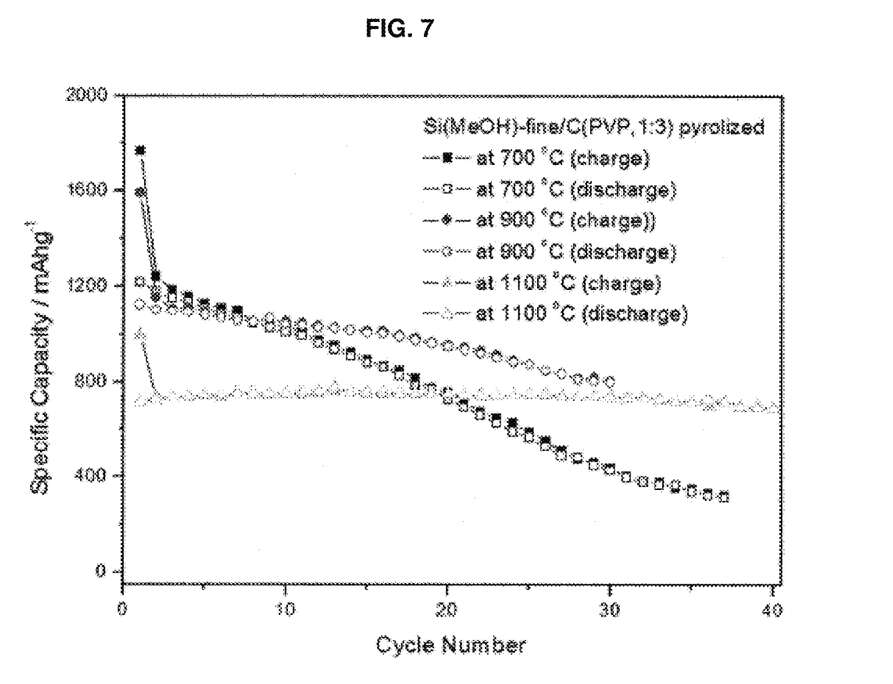
FIG. 7 is a graph showing the charge-discharge cycle characteristics of the silicon-carbon nanocomposite anode active material of the present invention according to heat treatment temperature.

FIG. 7 shows the charge-discharge cycle characteristics of the silicon-carbon nanocomposite anode active material prepared by heat-treating the fine particles under an argon atmosphere at 700° C., 900° C. and 1100° C. From FIG. 7, it can be ascertained that, as the heat treatment temperature increases, the content of carbon as well as the crystallinity of carbon increases, and that, as heat treatment temperature increases, the charge-discharge cycle characteristics of the silicon-carbon nanocomposite anode active material are greatly improved although the initial capacity thereof decreases.

Example 2

A 4-inch silicon wafer having a thickness of 0.525 mm was cut at 1 mm width intervals, formed into a silicon wire having a length of 70 mm, and then the silicon wire was electrically exploded in methanol using a 52 μF capacitor and a direct voltage of 12.3 kV to prepare a silicon nanocolloid solution. Subsequently, a carbon rod having a length of 70 mm and a diameter of 1 mm was electrically exploded (refer to Korean Patent Application No. 10-2008-0106817) in the silicon nanocolloid solution to prepare a solution in which silicon nanoparticles and graphite nanoparticles are dispersed, and then powder was recovered from the solution using a bottom-up continuous centrifugal separator at a rotation speed of 10,000 rpm. The recovered powder was heat-treated under an inert gas atmosphere to synthesize silicon-graphite nanocomposites.

Example 3

A 4-inch silicon wafer having a thickness of 0.525 mm was cut at 1 mm width intervals, formed into a silicon wire having a length of 70 mm, and then the silicon wire was electrically exploded in methanol using a 52 μF capacitor and a direct voltage of 12.3 kV to prepare a silicon nanocolloid solution. Subsequently, MCMB graphite powder was mixed with the silicon nanocolloid solution and then ultrasonically dispersed to prepare a mixed solution, and then powder was recovered from the mixed solution using a bottom-up continuous centrifugal separator at a rotation speed of 10,000 rpm. The recovered powder was re-dispersed in methanol, PVP was dissolved therein, and then the re-dispersed powder was heat-treated under an inert gas atmosphere to synthesize silicon-graphite-carbon nanocomposites.

Example 4

A 6-inch silicon wafer having a thickness of 0.625 mm was cut at 1 mm width intervals, formed into a silicon wire having a length of 100 mm, and then the silicon wire was electrically exploded in methanol using a 52 μF capacitor and a direct voltage of 12.3 kV to prepare a silicon nanocolloid solution. Subsequently, a nickel wire having a length of 100 mm and a diameter of 0.5 mm was electrically exploded in the silicon nanocolloid solution to prepare a solution in which silicon and nickel are mixed and dispersed, and then powder was recovered from the solution using a bottom-up continuous centrifugal separator at a rotation speed of 10,000 rpm. The recovered powder was heat-treated under an inert gas atmosphere to synthesize silicon-nickel active/inactive nanocomposites.

Example 5

A 6-inch silicon wafer having a thickness of 0.625 mm was cut at 1 mm width intervals, formed into a silicon wire having a length of 100 mm, and then the silicon wire was electrically exploded in methanol using a 52 μF capacitor and a direct voltage of 13.0 kV to prepare a silicon nanocolloid solution. Subsequently, a tin wire having a length of 100 mm and a diameter of 0.5 mm was electrically exploded (refer to Korean Patent Application No. 10-2011-0000573) in the silicon nanocolloid solution to prepare a solution in which silicon and tin are mixed and dispersed, and then powder was recovered from the solution using a bottom-up continuous centrifugal separator at a rotation speed of 10,000 rpm. The recovered powder was re-dispersed in methanol, PVP was added thereto, and then the re-dispersed powder was heat-treated under an inert gas atmosphere to synthesize silicon-tin active/inactive nanocomposites.

Example 6

Silicon powder and copper powder was mixed and pressed to form a plate having a thickness of 1 mm, and then the plate was cut at 1 mm width intervals to form a silicon-copper wire having a length of 70 mm. Then, the silicon-copper wire was electrically exploded in a PVP-dispersed solution using a 104 μF capacitor and a charging voltage of 12.0 kV. Then, powder was recovered using a bottom-up continuous centrifugal separator at a rotation speed of 10,000 rpm. The recovered powder was heat-treated under an inert gas atmosphere to synthesize silicon-copper active/inactive nanocomposites.

As such, the silicon-dispersed solution prepared by electric explosion in liquid and the silicon powder recovered therefrom are combined with a different kind of material to prepare a silicon-based nanocomposite anode active material, thus greatly improving the anode characteristics of a silicon-based anode material for a lithium secondary battery.

The present invention provides a method of preparing a silicon-based nanocomposite anode active material for a lithium secondary battery, wherein a silicon-based wire is mounted between two electrodes under a methanol-based solvent atmosphere, high-voltage pulses are applied to both ends of the silicon-based wire to gasify silicon-based wire and disperse silicon-based nanoparticles in the solvent by instantaneous resistance heating to prepare a silicon-based nanoparticle-dispersed solution, and then this solution is combined with a different kind of material to prepare a silicon-based nanocomposite anode material, thereby providing a lithium secondary battery having improved characteristics, and provides a lithium secondary battery using the same.

What is claimed is:

1. A method of preparing a silicon-based nanocomposite anode active material for a lithium secondary battery, comprising the steps of:
   (a) mounting a silicon-based wire between two electrodes provided in a methanol-based solvent atmosphere and then conducting high-voltage discharge to prepare a dispersion solution in which silicon nanoparticles are dispersed; and
   (b) combining the silicon nanoparticles with a different kind of material to prepare silicon-based nanocomposites.

2. The method of claim 1, wherein the silicon-based wire is made in the form of a wire, bar or ribbon by molding any one selected from among a silicon wafer, a silicon powder, a silicon alloy, and a mixed powder of silicon and a metal.

3. The method of claim 1, wherein, in step (a), the methanol-based solvent is pure methanol, a mixed solvent containing 50% or more of methanol or a solution in which a dispersant, a surfactant or a different kind of precursor is dissolved in the pure methanol or the mixed solvent.

4. The method of claim 1, further comprising the step of controlling the sizes of the silicon-based nanoparticles using any one method of natural sedimentation, centrifugal separation and filtering, after step (a).

5. The method of claim 1, wherein, in step (b), the different kind of material is an active material having reactivity with lithium and includes at least one selected from among C, Ge, Sn, Zn, Sb, Ag, Al, In, Pb, Te, S, P, Se, Mg, Ca, Ru, Rh, Pd, SiO, $TiO_2$, CoO, NiO, $Fe_2O_3$, $Mn_2O_3$, ZnO, and precursors thereof that can be synthesized by post-treatment.

6. The method of claim 1, wherein, in step (b), the different kind of material is an inactive material having no reactivity with lithium and includes at least one selected from among Ti, V, Cr, Mn, Fe, Ni, Co, Cu, SiC, $SiO_2$, $ZrO_2$, $Al_2O_3$, $Li_2O$, $Na_2O$, CaO, MgO, BeO, $WO_3$, $MoO_2$, and precursors thereof that can be synthesized by post-treatment.

7. The method of claim 1, wherein, in step (b), the silicon-based nanocomposites are prepared by recovering the silicon nanoparticles from the dispersion solution in the form of powder and then combining the powdered silicon nanoparticles with the different kind of material.

8. The method of claim 1, wherein, in step (b), the silicon-based nanocomposites are prepared by dissolving a precursor of the different kind of material in the dispersion solution and then performing any one selected from among drying, pyrolysis, combustion reduction, chemical reduction, mechanical alloying, and combinations thereof.

9. The method of claim 1, wherein, in step (b), the silicon-based nanocomposites are prepared by dispersing the different kind of material in the dispersion solution and then performing any one selected from among drying, pyrolysis, mechanical alloying, and combinations thereof.

10. A lithium secondary battery using the silicon-based nanocomposite anode active material prepared by the method of claim 1.

11. A lithium secondary battery using the silicon-based nanocomposite anode active material prepared by the method of claim 2.

* * * * *